United States Patent [19]

Hartman et al.

[11] Patent Number: 5,542,390
[45] Date of Patent: Aug. 6, 1996

[54] METHOD OF ALTITUDE COMPENSATION OF EXHAUST GAS RECIRCULATION IN AN INTAKE MANIFOLD FOR AN INTERNAL COMBUSTION ENGINE

[75] Inventors: Peter G. Hartman, W. Bloomfield; Keith L. Jones, Woodhaven; Thomas A. Larson, Bloomfield Hills; Gregory T. Weber, Commerce Twp., all of Mich.

[73] Assignee: Chrysler Corporation, Auburn Hills, Mich.

[21] Appl. No.: 380,165

[22] Filed: Jan. 30, 1995

[51] Int. Cl.$^6$ .......................... F02D 41/04; F02M 25/07; F02P 5/15
[52] U.S. Cl. .......................... 123/412; 123/416; 123/478; 123/571
[58] Field of Search .......................... 123/478, 480, 123/412, 568, 569, 570, 571, 416, 417

[56] References Cited

U.S. PATENT DOCUMENTS

| | | | |
|---|---|---|---|
| 4,009,699 | 3/1977 | Hetzler et al. | 123/416 |
| 4,050,429 | 9/1977 | Yasuhiro et al. | 123/568 |
| 4,128,885 | 12/1978 | Valek et al. | 364/424 |
| 4,150,648 | 4/1979 | Ogita | 123/568 |
| 4,171,691 | 10/1979 | Nohira et al. | 123/571 |
| 4,173,205 | 11/1979 | Toelle | 123/571 |
| 4,187,811 | 2/1980 | Katoh et al. | 123/568 |
| 4,399,799 | 8/1983 | Romblom et al. | 123/571 |
| 4,450,824 | 5/1984 | Ando et al. | 123/569 |
| 4,478,199 | 10/1984 | Narasaka et al. | 123/571 |
| 4,488,533 | 12/1984 | Sekiguchi et al. | 123/569 |
| 4,495,921 | 1/1985 | Sawamoto et al. | 123/480 |
| 4,602,606 | 7/1986 | Kawagoe et al. | 123/571 |
| 4,825,841 | 5/1989 | Norota et al. | 123/571 |
| 4,834,054 | 5/1989 | Hashimoto et al. | 123/571 |
| 4,881,509 | 11/1989 | Ohashi et al. | 123/571 |
| 4,947,820 | 8/1990 | Kushi | 123/571 |
| 5,002,031 | 3/1991 | Kalo | 123/486 |
| 5,029,570 | 7/1991 | Stoltman et al. | 123/571 |
| 5,113,835 | 5/1992 | Seki et al. | 123/571 |
| 5,150,696 | 9/1992 | Kabasin et al. | 123/571 |

*Primary Examiner*—Willis R. Wolfe
*Attorney, Agent, or Firm*—Margaret A. Dobrowitsky

[57] ABSTRACT

A method of altitude compensation of exhaust gas recirculation in an intake manifold for an internal combustion engine includes the steps of calculating vacuum at sea level, calculating vacuum at present altitude of the engine, determining whether the calculated vacuum at sea level is equal to the calculated vacuum at present altitude, and correcting the exhaust gas recirculation in the intake manifold if the calculated vacuum at sea level does not equal the calculated vacuum at present altitude.

11 Claims, 1 Drawing Sheet

5,542,390

METHOD OF ALTITUDE COMPENSATION OF EXHAUST GAS RECIRCULATION IN AN INTAKE MANIFOLD FOR AN INTERNAL COMBUSTION ENGINE

BACKGROUND OF THE INVENTION

1. Field of the Invention

The present invention relates generally to exhaust gas recirculation for internal combustion engines and, more particularly, to a method of altitude compensation of exhaust gas recirculation in an intake manifold for an internal combustion engine.

2. Description of the Related Art

Motor vehicles typically include an internal combustion engine for powering the vehicles. Commonly, these engines have an intake manifold, an exhaust manifold and an exhaust gas recirculation (EGR) system for recirculating a part of the exhaust gases from the exhaust manifold to the intake manifold for controlling emission of noxious components in exhaust gases from the engine. Currently, such an EGR system is an exhaust back-pressure controlled valve that is turned ON and OFF with an EGR vacuum solenoid. When there is back-pressure and power to the EGR vacuum solenoid, the EGR valve is opened. The EGR flow is essentially proportional to exhaust back-pressure and thus engine flow.

Barometric pressure and EGR mass flow rate decrease with increasing altitude. This decreases the actual percentage of EGR in the intake manifold. If this decrease is not compensated for, excessive fuel lean out and over spark advance will occur which can cause loss power and misfires of the engine at high altitudes. With the onset of lower tailpipe emissions and higher fuel economy regulations, there is a need in the art to provide more precise control of the EGR system.

SUMMARY OF THE INVENTION

It is, therefore, one object of the present invention to provide more precise control of EGR for an internal combustion engine.

It is another object of the present invention to provide a method of altitude compensation of EGR in an intake manifold of an internal combustion engine.

To achieve the foregoing objects, the present invention is a method of altitude compensation of exhaust gas recirculation in an intake manifold of an internal combustion engine. The method includes the steps of calculating vacuum at sea level and calculating vacuum at present altitude of the engine. The method also includes the steps of determining whether the calculated vacuum at sea level is equal to the calculated vacuum at present altitude and correcting exhaust gas recirculation in the intake manifold if the calculated vacuum at sea level does not equal the calculated vacuum at present altitude.

One advantage of the present invention is that a method is provided for more precise control of EGR for an internal combustion engine. Another advantage of the present invention is that the method provides altitude compensation of EGR in an intake manifold of an internal combustion engine. Yet another advantage of the present invention is that the method helps to lower tailpipe $NO_x$ emissions and improve fuel economy of the engine.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
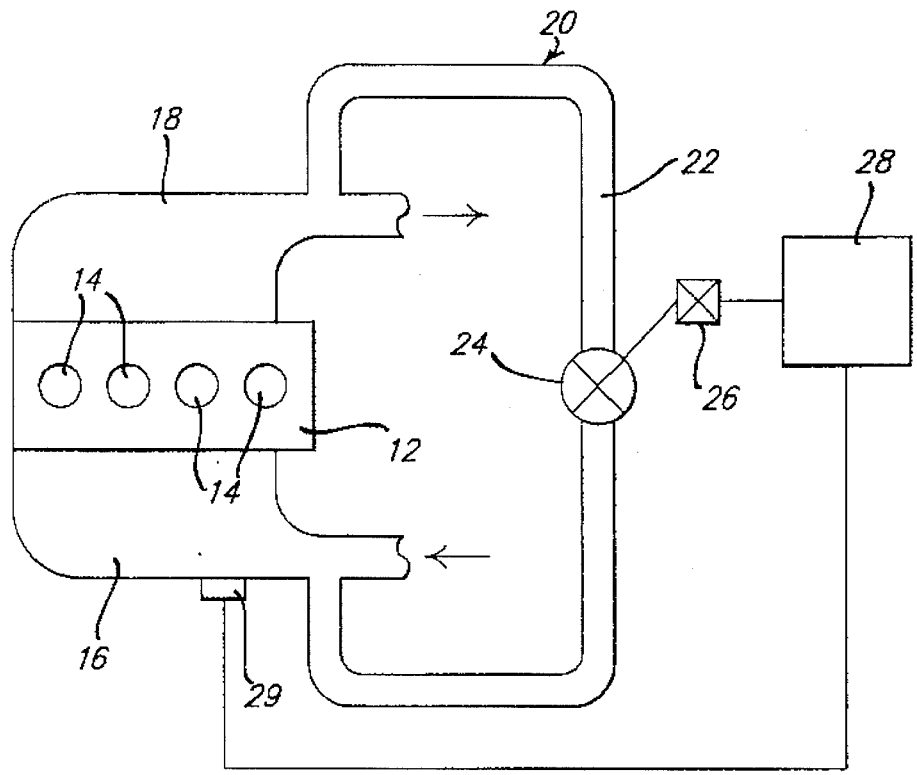
FIG. 1 is a schematic diagram of an exhaust gas recirculation system illustrated in operational relationship with an internal combustion engine.

Referring to FIG. 1, an internal combustion engine 10 is shown for a vehicle such as an automotive vehicle (not shown). The engine 10 has an engine block 12 with a plurality of cylinders 14 for combusting air and fuel therein. The engine 10 includes an intake manifold 16 connected to the cylinders 14 for allowing air flow into the cylinders 14. The engine 10 also includes an exhaust manifold 18 connected to the cylinders 14 for allowing exhaust gases to exit from the cylinders 14.

The engine 10 further includes an exhaust gas recirculation (EGR) system, generally indicated at 20, for recirculating a part of the exhaust gases from the exhaust manifold 18 to the intake manifold 16 of the engine 10. The EGR system 20 includes a passage 22 connecting the intake manifold 16 and exhaust manifold 18. The EGR system 20 also includes an EGR valve 24 disposed in a portion of the passage 22. Preferably, the EGR valve 24 is a pintle type valve which varies the flow of exhaust gases through the passage 22 by the amount the valve is opened. The EGR system 20 includes an electronic vacuum regulator (EVR) 26 to regulate the amount of vacuum going to the EGR valve 24. The EGR system 20 further includes an electronic control unit (ECU) 28 connected to the EVR 26 to electronically drive the EVR 26. The EGR system 20 includes a manifold absolute pressure (MAP) sensor 29 connected to the intake manifold 16 and to the ECU 28 to sense MAP of the engine 10. It should be appreciated that by varying a duty cycle to the EVR 26, the amount the EGR valve 24 is open can be controlled. It should also be appreciated that the ECU 28 has memory and a microprocessor as is known in the art.

Figure 2:
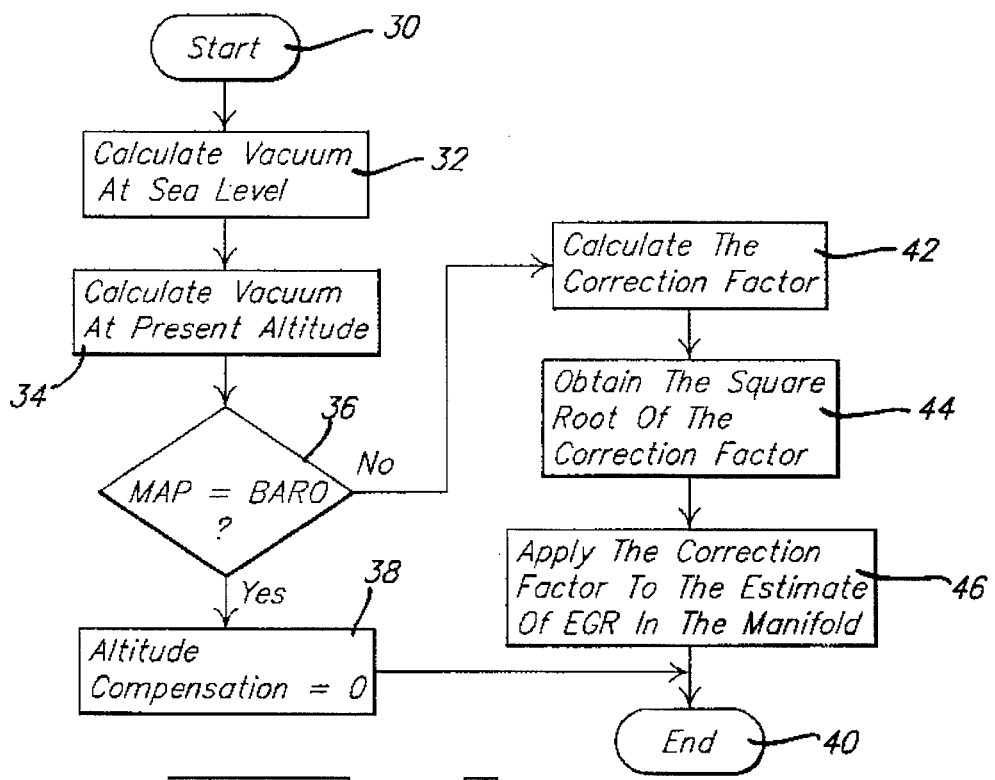
FIG. 2 is a flowchart of a method of altitude compensation of exhaust gas recirculation for the exhaust gas recirculation system and internal combustion engine of FIG. 1.

Referring to FIG. 2, a method of altitude compensation of EGR in the intake manifold 16 of the engine 10 is shown. The methodology starts in bubble 30 and advances to block 32. In block 32, the methodology calculates vacuum at sea level. The ECU 28 calculates this value by taking the difference between the barometric pressure at which engine mapping was conducted and a current MAP reading from the MAP sensor 29. It should be appreciated that the barometric pressure at which engine mapping was conducted is a predetermined value stored in memory of the ECU 28 as is known in the art.

After block 32, the methodology advances to block 34 and calculates vacuum at present altitude of the engine 10 in the vehicle. The ECU 28 calculates this value by taking the difference between the barometric pressure (BARO) from an altitude pressure sensor (not shown) and the current MAP reading from the MAP sensor 29. The methodology then advances to diamond 36 and determines whether MAP is equal to BARO. The ECU 28 compares the values of the barometric pressure and current MAP reading to see if they are equal. If so, the methodology advances to block 38 and sets an altitude compensation or correction factor equal to zero (0). After block 38, the methodology advances to bubble 40 and ends the routine.

In diamond 36, if MAP does not equal BARO, the methodology advances to block 42 and calculates a correction factor. The ECU 28 calculates the correction factor by dividing the calculated vacuum at present altitude by the calculated vacuum at sea level. The methodology then advances to block 44 and obtains the square root of the correction factor. The ECU obtains an altitude correction factor from the square root of the correction factor found a 2D look-up table stored in memory of the ECU. The look-up table is a table of empirically derived values of square root and correction factor. After block 44, the methodology advances to block 46 and applies the altitude correction factor to an estimate of EGR in the intake manifold 16. The ECU 28 calculates the estimate of EGR in the intake manifold 16 by adding the product of the previous calculated value of the estimate of EGR in the intake manifold multiplied by a constant to the product of a desired EGR multiplied by one minus the constant. After block 46 the methodology advances to bubble 40 and returns. The estimate of EGR in the intake manifold 16 compensated for altitude is then used to adjust the spark advance and fuel pulse width for fuel transferring components of the engine.

Accordingly, the method provides compensation in the EGR system 20 for changes in altitude which cause decreases in the barometric pressure and, therefore, the EGR mass flow rate. The method provides more precise control of the EGR system 20 to help lower tailpipe $NO_x$ emissions and improve fuel economy of the engine 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of altitude compensation of exhaust gas recirculation in an intake manifold for an internal combustion engine, said method comprising the steps of:

sensing manifold absolute pressure (MAP) from a MAP sensor;

calculating vacuum at sea level based on the sensed MAP;

calculating vacuum at present altitude of the engine based on the sensed MAP;

determining whether the calculated vacuum at sea level is equal to the calculated vacuum at present altitude;

correcting an estimate of the exhaust gas recirculation in the intake manifold if the calculated vacuum at sea level does not equal the calculated vacuum at present altitude; and adjusting spark advance and fuel pulsewidth for fuel transferring components of the engine based on the corrected estimate of the exhaust gas recirculation.

2. A method as set forth in claim 1 wherein said step of correcting comprises calculating a correction factor.

3. A method as set forth in claim 2 including the step of obtaining a square root of the correction factor.

4. A method as set forth in claim 3 including the step of applying the correction factor to an estimate of exhaust gas recirculation in the intake manifold of the internal combustion engine.

5. A method as set forth in claim 1 including the step of setting an altitude correction factor equal to zero if the calculated vacuum at sea level is equal to the calculated vacuum at present altitude.

6. A method of altitude compensation of exhaust gas recirculation in an intake manifold for an internal combustion engine, said method comprising the steps of:

sensing manifold absolute pressure (MAP) from a MAP sensor;

calculating vacuum at sea level based on the sensed MAP;

calculating vacuum at present altitude of the engine based on the sensed MAP;

determining whether the calculated vacuum at sea level is equal to the calculated vacuum at present altitude;

calculating a correction factor for the exhaust gas recirculation in the intake manifold if the calculated vacuum at sea level does not equal the calculated vacuum at present altitude;

obtaining a square root of the correction factor to obtain an altitude correction factor;

applying the altitude correction factor to an estimate of the exhaust gas recirculation in the intake manifold of the internal combustion engine; and adjusting spark advance and fuel pulsewidth for fuel transferring components of the engine based on the corrected estimate of the exhaust gas recirculation.

7. A method as set forth in claim 6 including the step of setting an altitude correction factor equal to zero if the calculated vacuum at sea level is equal to the calculated vacuum at present altitude.

8. A method as set forth in claim 6 wherein said step of calculating vacuum at sea level comprises substrating the sensed MAP from a barometric pressure at which engine mapping was conducted.

9. A method as set forth in claim 6 wherein said step of calculating vacuum at present altitude comprises subtracting the sensed MAP from a current barometric pressure.

10. A method as set forth in claim 6 wherein said step of calculating a correction factor comprises dividing the calculated vacuum at present altitude by the calculated vacuum at sea level.

11. A method of altitude compensation of exhaust gas recirculation in an intake manifold for an internal combustion engine, said method comprising the steps of:

sensing manifold absolute pressure (MAP) from a MAP sensor;

calculating vacuum at sea level by subtracting the sensed MAP from a barometric pressure at which engine mapping was conducted;

calculating vacuum at present altitude of the engine by subtracting the sensed MAP from a current barometric pressure;

determining whether the calculated vacuum at sea level is equal to the calculated vacuum at present altitude;

calculating a correction factor by dividing the calculated vacuum at present altitude by the calculated vacuum at sea level if the calculated vacuum at sea level does not equal the calculated vacuum at present altitude;

obtaining a square root of the correction factor;

applying the correction factor to an estimate of exhaust gas recirculation in the intake manifold of the internal combustion engine; and adjusting spark advance and fuel pulsewidth for fuel transferring components of the engine based on the corrected estimate of the exhaust gas recirculation.

\* \* \* \* \*